June 6, 1950     J. E. HANCOCK     2,510,779
ROTARY TERRACER AND DITCHER
Filed April 8, 1949     2 Sheets-Sheet 1
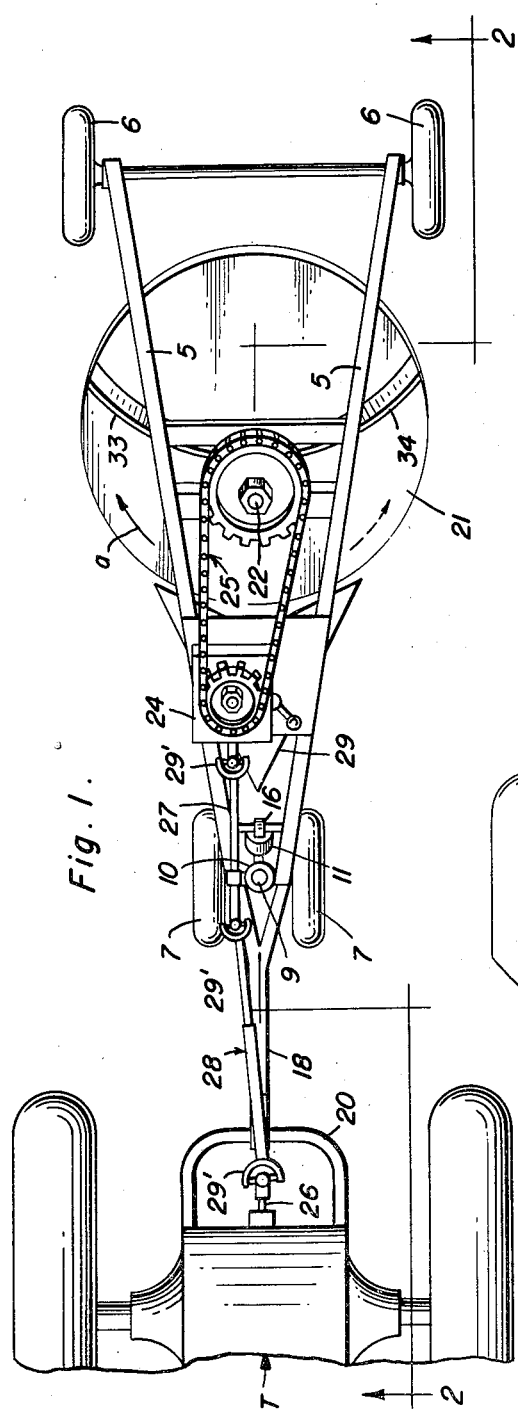
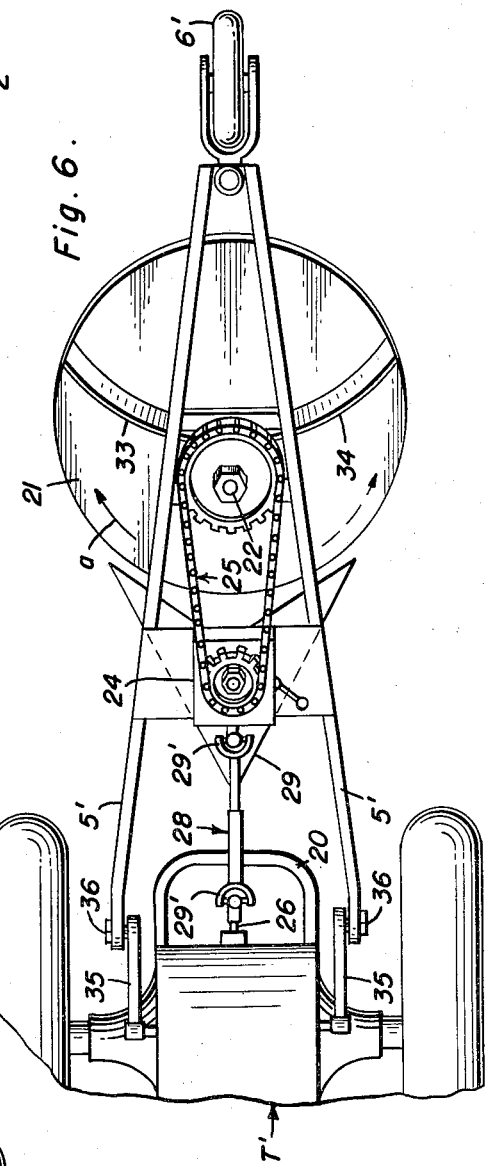
Inventor
James E. Hancock
By *Clarence A. O'Brien and Harvey B. Jacobson*
Attorneys June 6, 1950        J. E. HANCOCK        2,510,779
ROTARY TERRACER AND DITCHER
Filed April 8, 1949        2 Sheets-Sheet 2
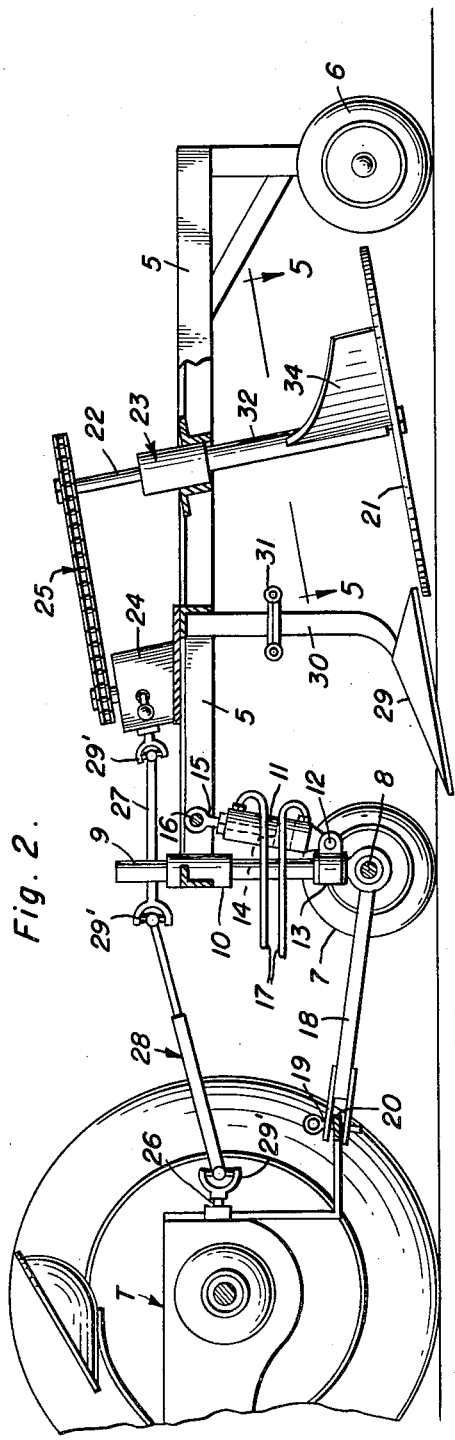
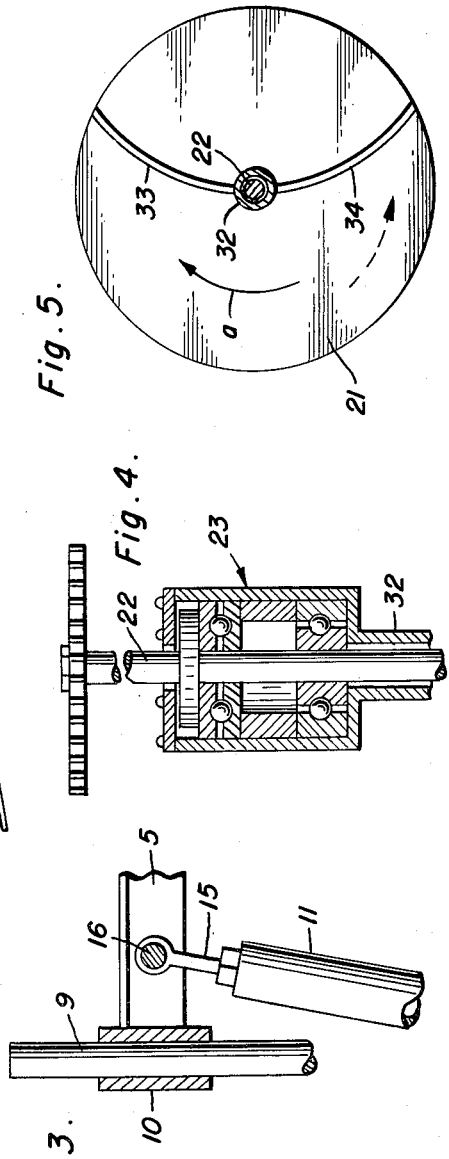
*Inventor*
James E. Hancock
By *Clarence A. O'Brien and Harvey B. Jacobson*
*Attorneys*

Patented June 6, 1950

2,510,779

UNITED STATES PATENT OFFICE 2,510,779

ROTARY TERRACER AND DITCHER

James E. Hancock, Lubbock, Tex.

Application April 8, 1949, Serial No. 86,333

6 Claims. (Cl. 37—99)

This invention relates to a machine for use in constructing terraces and digging ditches, and has more particular reference to an improved terracing and ditching machine of the type in which excavated soil is delivered onto a tilted rotary disk-like soil carrier, and wherein a discharging deflector deflects the soil from said soil carrier to one side of the machine.

The primary object of the present invention is to provide a machine of the above kind in which the soil carrier is tilted forwardly, soil is excavated and delivered onto the front of said soil carrier, means is provided to selectively drive said soil carrier in either direction desired, and means is provided to deflect the soil from said soil carrier to either side of the machine. In this way, the machine will operate to construct the same terrace when travelling in opposite directions, thereby avoiding an idle trip in one direction as required with machines in which the soil carrier is tilted laterally and the soil is always deflected from the soil carrier to one and the same side of the machine.

A further object is to provide a tractor drawn and driven machine of the above kind which is simple in construction, efficient in use and easy to use.

The exact nature of the present invention will become apparent from the following description when considered with the accompanying drawings, in which:

Figure 1 is a top plan view of one embodiment of the invention operatively connected to a tractor.

Figure 2 is a sectional view thereof taken on the line 2—2 of Figure 1.

Figure 3 is an enlarged fragmentary sectional view showing details of the means for supporting and vertically adjusting the front end of the machine.

Figure 4 is an enlarged fragmentary section, partly broken away, showing the means for journalling the shaft of the soil carrier.

Figure 5 is a section taken on the line 5—5 of Figure 2.

Figure 6 is a top plan view of another embodiment of the invention.

Referring in detail to the drawings, the embodiment of Figures 1 to 5, inclusive, includes a frame having rigidly connected and forwardly converging side rails 5 and supported at its rear end upon coaxial ground wheels 6 and at its front end upon steering wheels 7. The axle 8 of wheels 7 is carried by the lower end of a post 9 rotatable in and slidable through a bearing 10 rigid with the forward end of the frame, and this end of the frame is vertically adjustable by relatively moving the post 9 and said end of the frame through the medium of a hydraulic power device including a cylinder 11 pivoted at its lower end as at 12 to a collar 13 swivelled on the lower end of said post and a piston 14 reciprocable in said cylinder and having its piston rod 15 pivoted at 16 to the frame. Pressure fluid is admitted to either desired end of cylinder 11 through one of the pipes 17 while being exhausted from the other end of said cylinder through the other of said pipes under control of a suitable valve, not shown. The source of pressure fluid may consist of a conventional power-driven pump (not shown) on a tractor T by which the present machine is drawn over the ground. A draft tongue 18 is connected to the axle 8 and is adapted to be hitched at 19 to the drawbar 20 of the tractor.

A forwardly tilted disk-like soil carrier 21 is secured on the lower end of an inclined shaft 22 which is journaled in a combined thrust and radial bearing 23 rigidly mounted in the frame intermediate the ends of the latter. A conventional reversing gearing 24 is mounted on the frame near the forward end thereof, and the driven shaft of such gearing is operatively connected to shaft 22 by a sprocket gearing 25. The drive shaft of gearing 24 is adapted to be connected to the power take-off shaft 26 of the tractor by means of shafts 27 and 28 and universal joints 29', the shaft 28 being extensible and composed of telescoped sections.

Mounted in the frame at the front of the soil carrier 21 is a suitable plow 29 whose standard 30 preferably has an ordinary safety breakaway hinge 31 to prevent damage to said plow in case it strikes a firmly embedded rock or like object.

The shaft 22 extends through a tubular housing 32 rigid with and depending from the bearing 23, and laterally and rearwardly extending curved soil discharging deflectors 33 and 34 are rigid with and extend from opposite sides of the lower end of housing 32 and across the top of the soil carrier 21.

In operation, the machine is drawn ahead by the tractor, and the soil carrier 21 is driven from the power take-off shaft of said tractor. Assuming that a terrace is to be built at the right hand side of the machine as the latter is viewed in Figure 1, the gearing 24 is set to drive the soil carrier in the direction of the arrow a, the machine being drawn to the left. By vertically adjusting the forward end of the frame, the plow 29 is set to excavate the soil at the desired depth, and it delivers the soil rearwardly onto the soil carrier. As the soil carrier rotates, it carries the soil around to the deflector 33 which discharges the soil laterally from said soil carrier to the right hand side of the machine. After the machine has travelled to the point where the terrace is to end, the machine is turned around and drawn to the right or in the opposite direction, and the gearing 24 is set to drive the soil carrier in the reverse direction so that the soil is discharged by deflector 34 to the left hand side of the machine where the soil had been previously discharged when the machine was drawn to the left. Thus, the machine may operate to build the same terrace when moved in both directions, thereby avoiding idle trips in one direction of travel.

The embodiment shown in Figure 6 is adapted for use with a tractor T' having power lift arms 35 of a conventional hydraulic implement lift. Accordingly, this machine has no front supporting wheels, and it includes a frame having forwardly diverging side rails 5' adapted to be connected at their forward ends to the lift arms 35, as at 36, whereby the front end of the frame may be vertically adjusted to set the plow 29 for excavating at the desired depth. Also, the rear end of the frame is supported by a single caster wheel 6'. Otherwise, the two machines are alike, and remaining parts of both machines are indicated by similar reference characters. Of course, as the rails 5' are connected to lift arms 35, no draft tongue is needed for the machine of Figure 6.

Having described the invention, what is claimed as new is:

1. In a rotary terracer and ditcher, a wheeled frame, a forwardly tilted disk-like soil carrier rotatably mounted in the frame, the lowermost peripheral portion of the soil carrier being close to the ground and directly forward of the axis of said carrier, a soil excavating plow mounted in the frame directly in front of the lowermost peripheral portion of the soil carrier and delivering the excavated soil onto the front of the latter, discharging deflectors mounted at opposite sides of the axis of said soil carrier and extending across the top of the latter to opposite sides of the machine, and driving means operable to selectively drive said soil carrier in either of opposite directions.

2. The construction defined in claim 1, in combination with means to hitch the machine to a tractor for being drawn ahead thereby, and means to operatively connect said driving means to a power take-off shaft of the tractor.

3. The construction defined in claim 1, in combination with means to vertically adjust the forward end of the frame for regulating the depth of operation of said plow.

4. The construction defined in claim 1, wherein said driving means includes a reversing gearing mounted on the frame in front of the soil carrier and having a driven shaft geared to the latter, said reversing gearing further having a drive shaft adapted for connection with the power take-off shaft of a tractor.

5. The construction defined in claim 1, wherein the frame includes forwardly diverging side rails adapted for connection at their forward ends to power lift arms of a tractor, said frame having a single rear supporting caster wheel.

6. The construction defined in claim 1, wherein the frame has front steering and supporting wheels provided with a steering post which is vertically adjustable relative to the frame and provided with a draft tongue for connection with the drawbar of a tractor, and a power device interposed between the steering post of the front wheels and the frame for relatively adjusting them.

JAMES E. HANCOCK.

No references cited.